United States Patent
Bergano

(10) Patent No.: US 6,411,413 B1
(45) Date of Patent: Jun. 25, 2002

(54) METHOD AND APPARATUS FOR PERFORMING DISPERSION COMPENSATION WITHOUT A CHANGE IN POLARIZATION AND A TRANSMITTER INCORPORATING SAME

(75) Inventor: Neal S. Bergano, Lincroft, NJ (US)

(73) Assignee: TyCom (US) Inc., Morristown, NJ (US)

(*) Notice: Subject to any disclaimer, the term of this patent is extended or adjusted under 35 U.S.C. 154(b) by 0 days.

(21) Appl. No.: 09/031,011

(22) Filed: Feb. 26, 1998

(51) Int. Cl.[7] .............. H04B 10/00; H04B 10/04; H04B 10/18
(52) U.S. Cl. .............. 359/133; 359/180; 359/188; 359/124
(58) Field of Search ................ 359/127, 124, 359/122, 133, 161, 115; 385/37

(56) References Cited

U.S. PATENT DOCUMENTS

| | | | |
|---|---|---|---|
| 5,224,183 A | * 6/1993 | Dugan | 385/24 |
| 5,479,082 A | * 12/1995 | Calvani | 359/127 |
| 5,596,448 A | * 1/1997 | Onaka | 359/341 |
| 5,696,614 A | * 12/1997 | Ishikawa | 359/124 |
| 5,841,557 A | * 11/1998 | Otsuka | 359/122 |
| 5,877,879 A | * 3/1999 | Naito | 359/133 |
| 5,946,129 A | * 8/1999 | Xu | 359/332 |
| 5,966,236 A | * 10/1999 | Okuno | 359/337 |
| 6,049,415 A | * 4/2000 | Grubb | 359/341 |
| 6,055,081 A | * 4/2000 | Koyano | 359/161 |

* cited by examiner

Primary Examiner—Jason Chan
Assistant Examiner—Agustin Bello

(57) ABSTRACT

A method and apparatus is provided for transmitting an optical signal. The method includes the step of generating an optical signal that includes a plurality of optical channels, which are sequentially numbered from 1 to N from lowest to highest wavelength. Dispersion compensation is imparted to each of the plurality of optical channels without a change in polarization of the channels. A state-of-polarization of predetermined odd-numbered channels is oriented to be substantially orthogonal to a state of polarization of predetermined even-numbered channels by directing the predetermined odd-numbered channels and the predetermined even-numbered channels through orthogonally polarizing inputs of a polarization coupler. The odd-numbered channels and the even-numbered channels may be directed through first and second wavelength combiners, respectively, prior to orienting their states of polarization. The orthogonal relationship between the states of polarization of odd and even-numbered channels advantageously limits the four-wave mixing products that can be generated in the optical transmitter and the optical transmission path to which it is typically coupled.

25 Claims, 5 Drawing Sheets

METHOD AND APPARATUS FOR PERFORMING DISPERSION COMPENSATION WITHOUT A CHANGE IN POLARIZATION AND A TRANSMITTER INCORPORATING SAME

FIELD OF THE INVENTION

The invention relates generally to wavelength division multiplexed transmission systems, and more particularly to a method and apparatus for performing dispersion compensation without a change in polarization.

BACKGROUND OF THE INVENTION

Wavelength-division multiplexing is expected to be increasingly utilized in undersea and transcontinental terrestrial optical transmission systems due, in part, to the large bandwidth capacity such multiplexing provides. One way of increasing the total transmission capacity of such systems is to more efficiently use the available spectral bandwidth such as by decreasing the spacing between adjacent ones of the multiplexed channels. Unfortunately, wavelength division multiplexed transmission systems are susceptible to performance limitations due to polarization dependent effects such as cross-talk between the multiplexed channels. Cross-talk, which is primarily caused by the non-linear index of refraction of optical transmission fibers, increases as the channel spacing decreases. Four-wave mixing is one significant deleterious effect that produces cross-talk U.S. Application Serial No. [N.S. Bergano 22-4] entitled "Method and Apparatus for Improving Spectral Efficiency in Wavelength Division Multiplexed Transmission Systems," discloses an optical transmitter that generates a WDM signal having even-numbered channels in a state of polarization (SOP) orthogonal to the SOP of the odd-numbered channels. This arrangement advantageously limits the four-wave mixing products that can be generated in the transmitter and the optical transmission path to which it is typically coupled.

Wavelength division multiplexed systems must also employ dispersion management techniques. As the per channel data rates of such system increase, the interplay of dispersion and fiber nonlinearity needs to be more carefully managed. Typically the transmission line is designed to have an average dispersion value of zero. In the case of WDM systems, however, only one channel can be arranged to have an average dispersion of zero. The remaining channels will have some net nonzero dispersion due to the dispersion slope of the optical fibers forming the transmission One technique for overcoming this limitation in WDM systems is to compensate for those channels that do not have a net zero dispersion by adding compensating dispersion fiber at the receiver or transmitter so that their net accumulated dispersion is zero. It has been shown to be advantageous to provide a portion of the dispersion compensation at the transmitter and a portion at the receiver.

While it would be beneficial to provide a transmitter that offers both dispersion compensation and a signal in which adjacent channels have orthogonal SOPs, such a transmitter has not been available because it has not been possible to perform dispersion compensation in a polarization maintaining environment.

Accordingly, it would be desirable to provide a method and apparatus for performing dispersion compensation without changing the polarization of the optical signal.

SUMMARY OF THE INVENTION

In accordance with the present invention, a method and apparatus is provided for transmitting an optical signal. The method includes the step of generating an optical signal that includes a plurality of optical channels, which are sequentially numbered from 1 to N from lowest to highest wavelength. Dispersion compensation is imparted to each of the plurality of optical channels without a change in polarization of the channels. A state-of-polarization of predetermined odd-numbered channels is oriented to be substantially orthogonal to a state of polarization of predetermined even-numbered channels by directing the predetermined odd-numbered channels and the predetermined even-numbered channels through orthogonally polarizing inputs of a polarization coupler. The odd-numbered channels and the even-numbered channels may be directed through first and second wavelength combiners, respectively, prior to orienting their states of polarization. The orthogonal relationship between the states of polarization of odd and even-numbered channels advantageously limits the four-wave mixing products that can be generated in the optical transmitter and the optical transmission path to which it is typically coupled.

In one embodiment of the invention, dispersion compensation is provided by device that includes an optical circulator having an input port, an intermediate port, and an output port. First and second polarization maintaining optical fibers are respectively coupled to the input and output ports. The first and second polarization maintaining fibers have an orientation offset by 90 degrees with respect to one another. A single mode fiber is coupled at one end to the intermediate port and at the other end to a dispersion compensating fiber. A Faraday rotator mirror is coupled to the dispersion compensating fiber. Such a device provides dispersion compensation without a change in polarization.

In another embodiment of the invention, the dispersion compensator includes an optical circulator having an input port, an intermediate port, and an output port. First, second and third polarization maintaining optical fibers are respectively coupled to the input, intermediate and output ports. A Faraday rotator is coupled at one end to the second polarization maintaining fiber and at another end to a chirped fiber grating.

DETAILED DESCRIPTION

Figure 1:
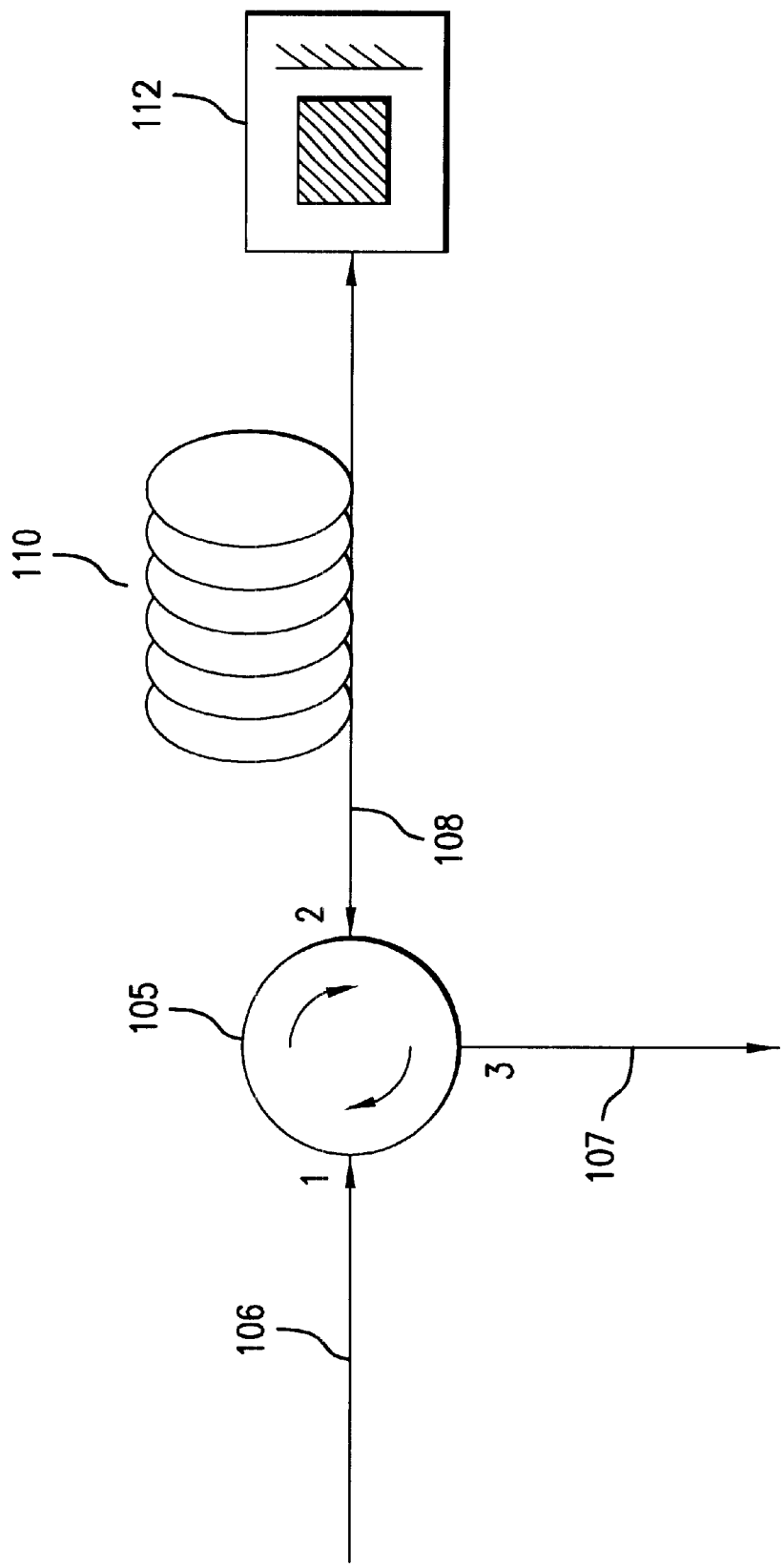
FIGS. 1–3 show alternative embodiments of a dispersion compensator constructed in accordance with the present invention.

FIG. 1 shows a first embodiment of a polarization maintaining chromatic dispersion compensator constructed in accordance with the present invention. As shown, a circulator 105 has three ports, input port 1, output port 3 and intermediate port 2. Ports 1 and 3 are connected to polarization maintaining fibers (PMF) 106 and 107. PMFs 106 and 107 are oriented at 90 degrees with respect to one another. Port 2 is connected to a conventional single mode fiber 108, which in turn is connected to dispersion compensating fiber 110. A Faraday rotator mirror 112 is coupled to the dispersion compensating fiber 110. The Faraday rotator mirror 112 serves to reflect the incoming signal in such a way that light exiting the mirror has an orthogonal state-of-polarization with respect to the incoming signal. One example of an appropriate Faraday rotator mirror is currently available from E-TEK Dynamics, Inc., as part number (HSFM).

In operation, an optical signal directed from the circulator 105 to the Faraday rotator mirror 112 and back to circulator 105, will have a polarization on output port 3 that is invariant to polarization changes that occur between the circulator 105 and the Faraday rotator mirror 112. That is, an optical signal directed to input port 1 will appear on output port 3 without a change in polarization, even if single mode fiber 108 and dispersion compensating fiber 110 do not maintain this polarization state. Accordingly, dispersion compensation is performed in a local environment that avoids the need for a polarization maintaining fibers.

Figure 2:
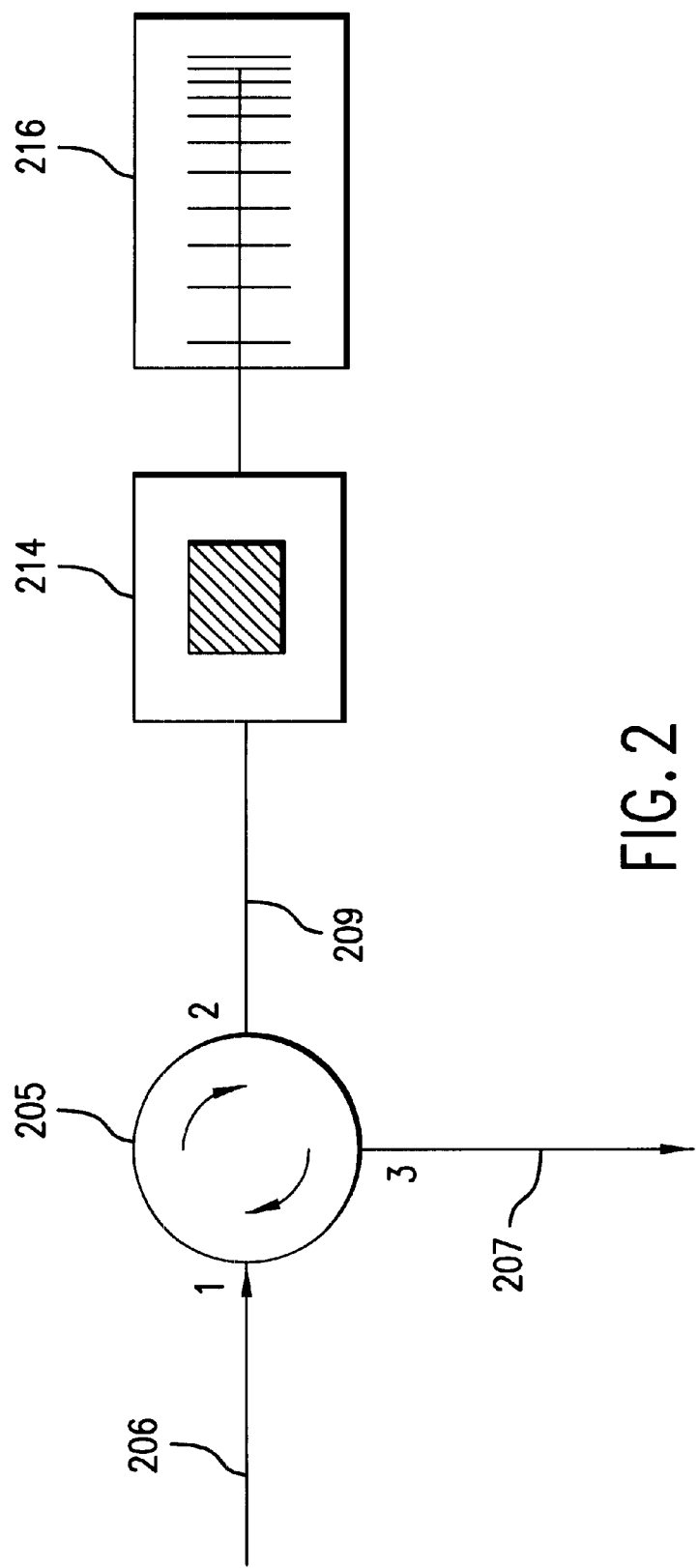

A FIG. 2 shows an alternative embodiment of the invention. As in the FIG. 1 embodiment, the input and output ports 1 and 3 of circulator 205 are connected to polarization maintaining fibers 206 and 207. However, in the FIG. 2 embodiment port 2 is also connected to a polarization maintaining fiber 209. A Faraday rotator 214 is connected to PMF 209 and a chirped fiber grating 216. One example of an appropriate Faraday rotator is currently available from ETEK Dynamics, Inc., as part number (IFFR). The chirped fiber grating 216 performs the dispersion compensation. In a preferred embodiment of the invention, the Faraday rotator 214 is located in close proximity to the agrating 216 to minimize local polarization changes between the two optical elements.

In operation, the incident optical signal traveling from the circulator 205 to the Faraday rotator 214 would have an orthogonal polarization with respect to the returning signal traveling in the opposite-going direction. In this case the incident and return signal would use the two axes of the polarization maintaining fiber 209. The embodiment shown in FIG. 2 employs a polarization maintaining fiber 209 between the circulator 205 and Faraday rotator 214 so that the signals incident on the chirped fiber grating 216 are always in the same state-of-polarization, thus minimizing any problems associated with polarization dependence in grating 216. However, polarization maintaining fiber 209 is not required. Those of ordinary skill in the art will recognize that the combination of Faraday rotator 214 and grating 216 forms a Faraday rotator mirror, which also provides the requisite dispersion compensation, and therefore could be coupled to circulator 205 by a non polarization maintaining fiber 209.

In an alternative embodiment of the invention, the Faraday rotator 214 shown in FIG. 2 may be replaced with a polarizer. In this case the incident and return signals have a linear state-of-polarization in polarization maintaining fiber 209. The incident signal emerging from intermediate port 2 of circulator 205 is well polarized and traverses the polarizer with little optical attenuation. The returning signal reflected from the grating 216 travels back through the polarizer to intermediate port 2 of circulator 205. Those skilled in the art will realize that the combination of the polarizer and grating 216 could be replaced with a chirped grating directly incorporated into a polarization maintaining fiber. Of course, in this arrangement rotator 214 (or the polarizer) shown in FIG. 2 is not required.

Other alternative embodiments of the invention do not require a circulator. For example, in FIG. 2, the circulator 205 may be replaced with a polarization combiner. The polarizing beam splitter 305 is a device that allows one linear polarization state (indicated by arrows 320) to travel between port 1 and port 2 with low loss, and allows the orthogonal linear polarization state (indicated by dots 321) to travel between port 2 and port 3 with low loss. Thus, the incoming signal in polarization maintaining fiber 306 (in polarization state 320) travels from port 1 to port 2 of beam splitter 305, then to the rotator 314 and chirped fiber grating 316. As in FIG. 2, the return signal is in a polarization state orthogonal to the incident signal, and thus, is able to travel between ports 2 and 3 in beam splitter 305 with low loss.

Figure 4:
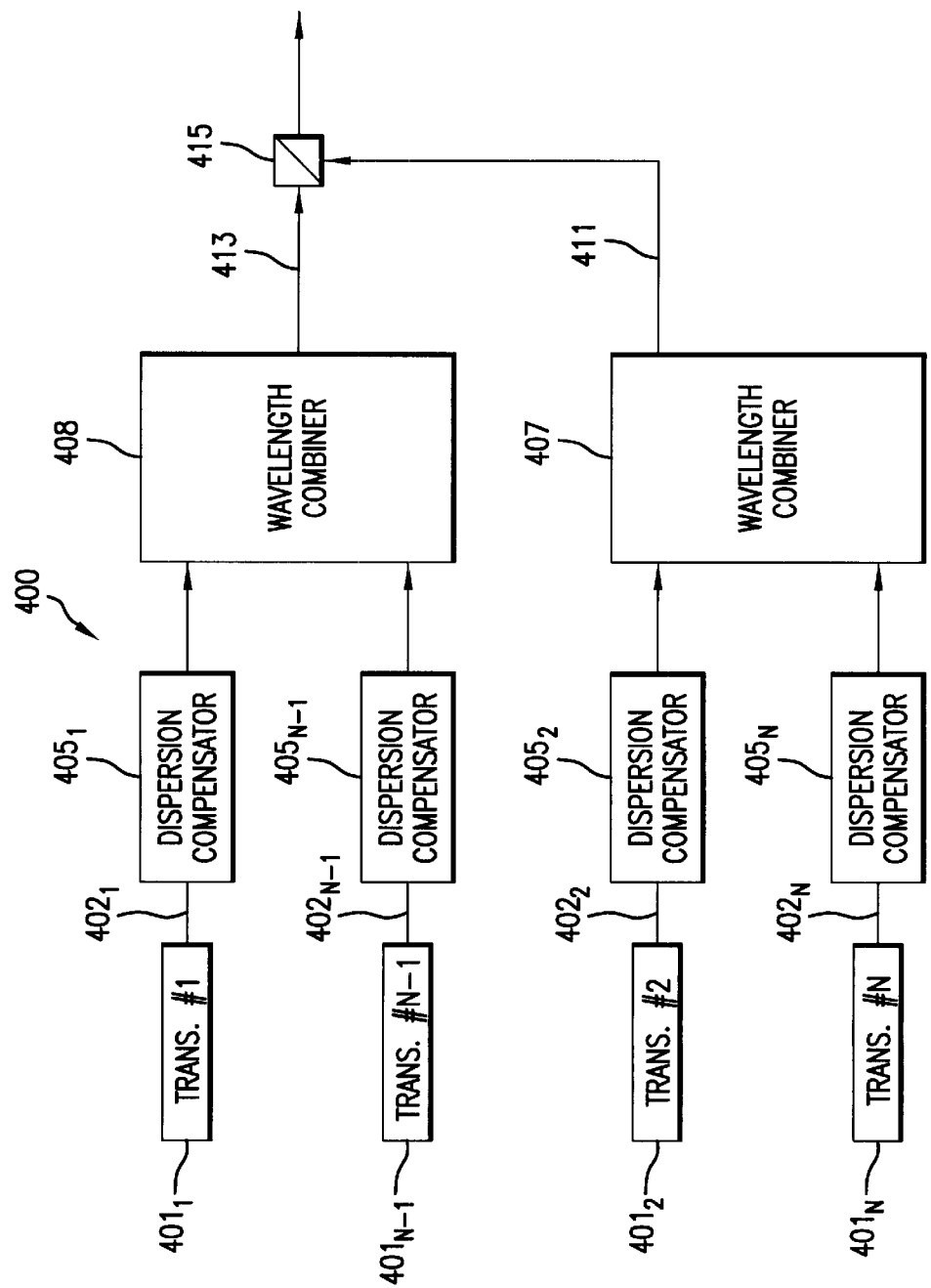
FIG. 4 shows a simplified block diagram of an illustrative embodiment of an optical transmitter constructed in accordance with the present invention.

FIG. 4 is a simplified block diagram of an optical transmitter 400 that employs a polarization maintaining dispersion compensator such as shown in FIGS. 1 and 2. As shown, optical transmitter 400 includes a plurality of optical data sources $401_1$, $401_2$, ... $401_N$. The plurality of optical data sources $401_1$, $401_2$, ... $401_N$ which could be, for example, wavelength-tunable semiconductor lasers in combination with lithium niobate intensity modulators, to generate a plurality of continuous-wave optical signals $402_1$, $402_2$, ... $402_N$ each having a different wavelength $\lambda_1, \lambda_2, \ldots \lambda_N$, respectively, thus defining a plurality of N optical channels. For discussion purposes, the channels may be sequentially numbered 1, 2, ... N, from lowest to highest wavelength. The plurality of optical data sources $401_1$, $401_2$, ... $401_N$, are arranged in sequential order so that optical channels $402_1$, $402_2$, ... $402_N$ are produced in ascending (or descending) wavelength order from $\lambda_1$ to $\lambda_N$. The output of each optical data source $401_1$, $401_2$, ... $401_N$ is coupled to a polarization maintaining dispersion compensator $405_1$, $405_2$, ... $405_N$.

As shown in FIG. 4, the optical data sources 401 are grouped into two sets, a first set of odd-numbered optical data sources $401_1$, $401_3$, ... $401_{N-1}$ and a second set of even-numbered optical data sources $401_2$, $401_4$, ... $401_N$, where $N_i$ is even. That is, the first set of optical sources produces, in sequential order, the odd-numbered wavelengths $\lambda_1, \lambda_3, \ldots \lambda_{N-1}$ while the second set of optical sources produces, in sequential order, the even-numbered wavelengths $\lambda_2, \lambda_4, \ldots \lambda_N$. Even-numbered wavelengths are directed to a first wavelength combiner 407 while the odd-numbered wavelengths are directed to a second wavelength combiner 408. The wavelength combiners 407 and 408 may comprise, for example, directional couplers, star couplers or wavelength routers.

Wavelength combiner 407 forms an output signal 411 comprising N/2 optical channels with each channel being in substantially the same polarization state. Similarly, wavelength combiner 408 forms an output signal 413 comprising N/2 optical channels with each channel being in substantially the same polarization state. The polarization states of output signals 411 and 413 may or may not be the same. Output signals 411 and 413 are directed to a polarization combiner 415 for combining the N/2 channels of output signals 411 and 413. The N/2 channels of output signal 411 are aligned by polarization combiner 415 in a first polarization state and the N/2 channels of output signal 413 are polarized by polarization combiner 415 in a second polarization state that is orthogonal to the first polarization state. The resulting output from the polarization combiner 415 is an output signal in which adjacent channels are orthogonally polarized.

Figure 3:
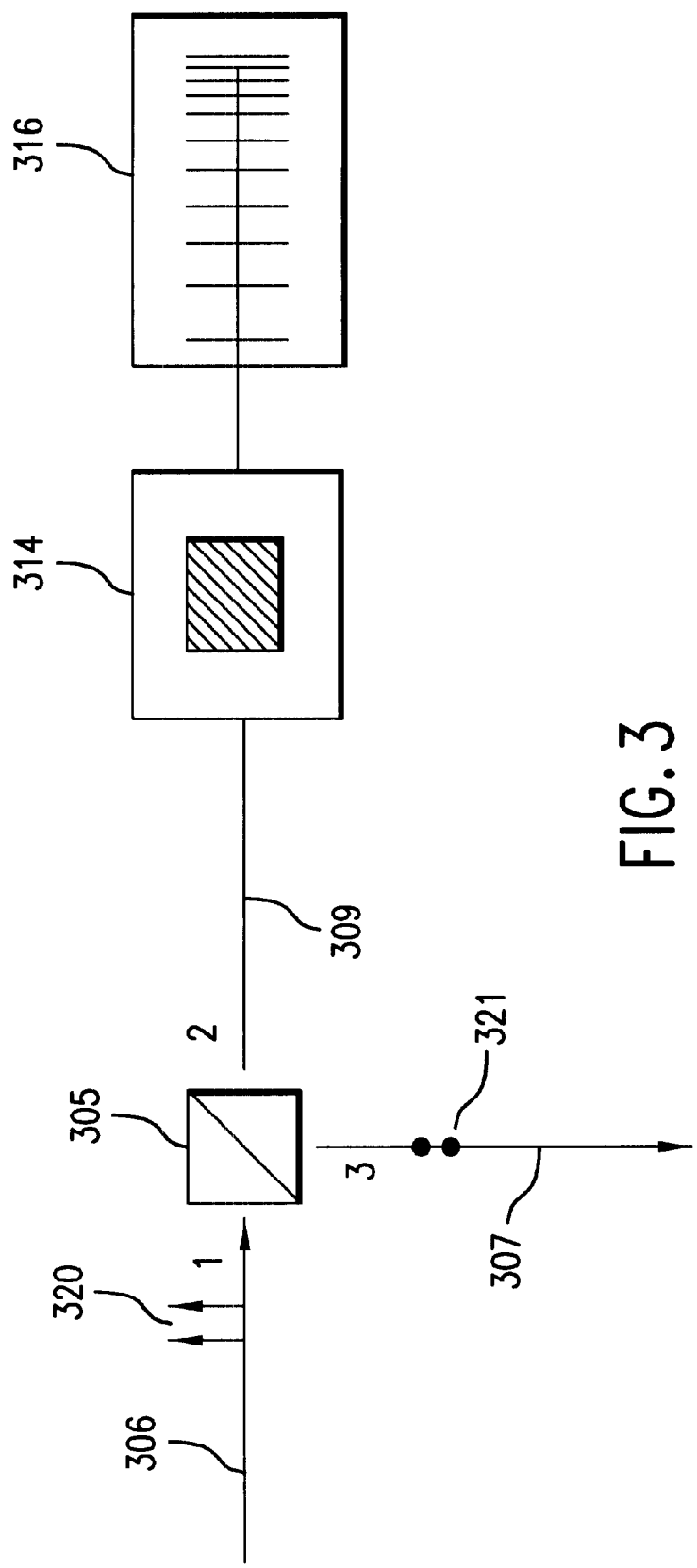
Figure 5:
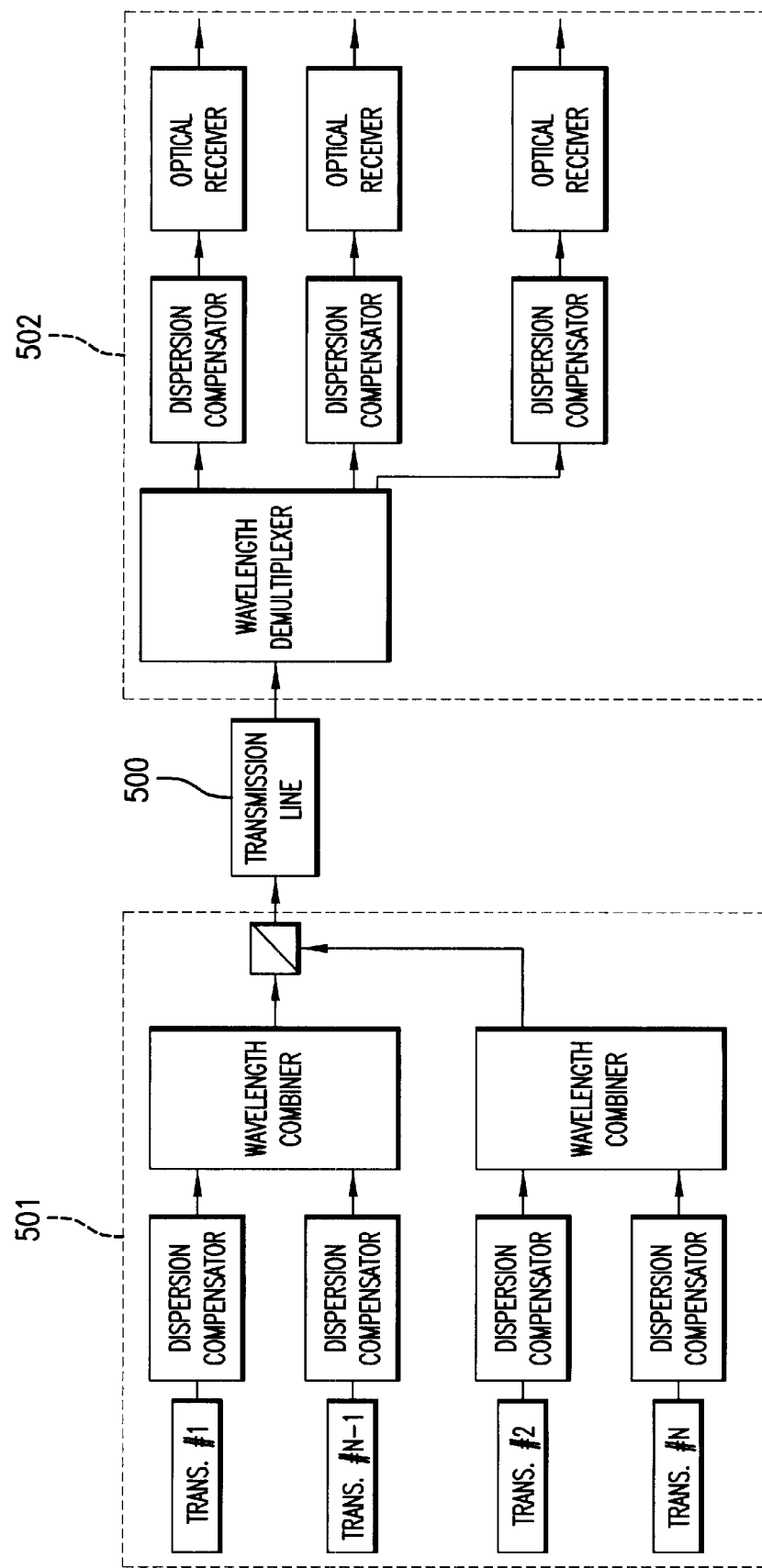
FIG. 5 shows an exemplary optical communication system that incorporates the transmitter shown in FIG. 4.

FIG. 5 shows a simplified block diagram of an exemplary optical fiber transmission system that employs the transmitter shown in FIG. 4. The system includes an optical transmission path 500, a transmitting terminal 501, and a receiving terminal 502. The transmitting terminal 501 corresponds to the transmitter 500 shown in FIG. 3. The optical signal presented by the terminal 501 to the transmission path 500 may comprise a plurality of WDM optical carriers each carrying an SDH signal. The transmission path 500 also includes optical amplifiers (not shown), which may be EDFAs, for example, which amplify optical signals in the 1550 wavelength band. In one embodiment of the invention the transmission fibers may be dispersion shifted single-mode fibers with an average zero dispersion wavelength higher than the operating wavelengths of the system. The receiving terminal 502 may include conventional dispersion compensators (i.e., not polarization maintaining dispersion compensators) so that dispersion compensation is provided at the receiving terminal as well as at the transmitting terminal 501.

The invention claimed is:

1. A dispersion compensator, comprising:

an optical circulator having an input port, an intermediate port, and an output port;

first and second polarization maintaining optical fibers respectively coupled to said input and output ports, said first and second polarization maintaining fibers having an orientation offset by 90 degrees with respect to one another;

a single mode fiber coupled to said intermediate port;

a dispersion compensating fiber coupled to said single mode fiber; and a Faraday rotator mirror coupled to said dispersion compensating fiber.

2. A dispersion compensator, comprising:

an optical circulator having an input port, an intermediate port, and an output port;

first, second and third polarization maintaining optical fibers respectively coupled to said input, said intermediate and said output ports;

a Faraday rotator coupled to said second polarization maintaining fiber; and a chirped fiber grating coupled to said Faraday rotator.

3. A dispersion compensator, comprising:

an optical circulator having an input port, an intermediate port and an output port;

first, second and third polarization maintaining optical fibers respectively coupled to said input, said intermediate and said output ports;

a polarizer coupled to said polarization maintaining fiber;

a chirped fiber grating coupled to said polarizer.

4. An optical transmitter for transmitting a wavelength division multiplexed optical signal, comprising:

a plurality of 1, 2, . . . N optical sources for generating a plurality of N optical channels;

a first plurality of polarization maintaining chromatic dispersion compensators coupled to predetermined even-numbered optical sources, at least one of said compensators further comprising:
an optical circulator having an input port, an intermediate port, and an output port;
first and second polarization maintaining optical fibers respectively coupled to said input and output ports, said first and second polarization maintaining fibers having an orientation offset by 90 degrees with respect to one another;
a single mode fiber coupled to said intermediate port;
a dispersion compensating fiber coupled to said singe mode fiber; and
a Faraday rotator mirror coupled to said dispersion compensating fiber;

a second plurality of polarization maintaining chromatic dispersion compensators coupled to predetermined odd-numbered optical sources;

a first (N/2)×1 multiplexer coupled to said first plurality of polarization maintaining chromatic dispersion compensators for combining even-numbered optical channels into a first wavelength division multiplexed optical signals;

a second (N/2)×1 multiplexer coupled to said second plurality of polarization maintaining chromatic dispersion compensators for combining odd-numbered optical channels into a second wavelength division multiplexed optical signal;

a coupler having first and seconds inputs respectively coupled to said first and second multiplexers such that a wavelength division multiplexed optical signal is produced in which said odd-numbered optical channels have a state of polarization that is substantially orthogonal to said even-numbered optical channels.

5. The transmitter of claim 4 wherein at least one optical source comprises a laser.

6. The transmitter of claim 5 wherein said laser comprises a wavelength-tunable laser.

7. The transmitter of claim 4 further including at least one data modulator coupled to at least one of said plurality of optical sources for modulating data from at least one data source onto predetermined ones of said optical channels.

8. An optical transmitter for transmitting a wavelength division multiplexed optical signal, comprising:

a plurality of 1, 2, . . . N optical sources for generating a plurality of N optical channels;

a first plurality of polarization maintaining chromatic dispersion compensators coupled to predetermined even-numbered optical sources, at least one of said compensators further comprising:
an optical circulator having an input port, an intermediate port, and an output port;
first, second and third polarization maintaining optical fibers respectively coupled to said input, said intermediate and said output ports;
a Faraday rotator coupled to said second polarization maintaining fiber;
a chirped fiber grating coupled to said Faraday rotator;

a second plurality of polarization maintaining chromatic dispersion compensators coupled to predetermined odd-numbered optical sources;

a first (N/2)×1 multiplexer coupled to said first plurality of polarization maintaining chromatic dispersion compensators for combining even-numbered optical channels into a first wavelength division multiplexed optical signals;

a second (N/2)×1 multiplexer coupled to said second plurality of polarization maintaining chromatic dispersion compensators for combining odd-numbered optical channels into a second wavelength division multiplexed optical signal;

a coupler having first and seconds inputs respectively coupled to said first and second multiplexers such that a wavelength division multiplexed optical signal is produced in which said odd-numbered optical channels have a state of polarization that is substantially orthogonal to said even-numbered optical channels.

9. The transmitter of claim 8 wherein at least one optical source comprises a laser.

10. The transmitter of claim 9 wherein said laser comprises a wavelength-tunable laser.

11. The transmitter of claim 9 further including at least one data modulator coupled to at least one of said plurality of optical sources for modulating data from at least one data source onto predetermined ones of said optical channels.

12. An optical transmitter for transmitting a wavelength division multiplexed optical signal, comprising:

a plurality of 1, 2, ... N optical sources for generating a plurality of N optical channels;

a first plurality of polarization maintaining chromatic dispersion compensators coupled to predetermined even-numbered optical sources, at least one of said compensators further comprising:
   an optical circulator having in input port, an intermediate port and an output port;
   first, second and third polarization maintaining optical fibers respectively coupled to said input, said intermediate and said output ports;
   a polarizer coupled to said second polarization maintaining fiber;
   a chirped fiber grating coupled to said polarizer;

a second plurality of polarization maintaining chromatic dispersion compensators coupled to predetermined odd-numbered optical sources;

a first (N/2)×1 multiplexer coupled to said first plurality of polarization maintaining chromatic dispersion compensators for combining even-numbered optical channels into a first wavelength division multiplexed optical signals;

a second (N/2)×1 multiplexer coupled to said second plurality of polarization maintaining chromatic dispersion compensators for combining odd-numbered optical channels into a second wavelength division multiplexed optical signal;

a coupler having first and seconds inputs respectively coupled to said first and second multiplexers such that a wavelength division multiplexed optical signal is produced in which said odd-numbered optical channels have a state of polarization that is substantially orthogonal to said even-numbered optical channels.

13. The transmitter of claim 12 wherein at least one optical source comprises a laser.

14. The transmitter of claim 13 wherein said laser comprises a wavelength-tunable laser.

15. The transmitter of claim 13 further including at least one data modulator coupled to at least one of said plurality of optical sources for modulating data from at least one data source onto predetermined ones of said optical channels.

16. An apparatus for transmitting a wavelength division multiplexed optical signal, the apparatus comprising:
   means for generating an optical signal including a plurality of optical channels wherein said plurality of optical channels are sequentially numbered from 1 to N from lowest to highest wavelength;
   means for imparting dispersion compensation to each of said plurality of optical channels without a change in polarization of said channels, said dispersion compensating means comprises:
      an optical circulator having an input port, an intermediate port, and an output port;
      first and second polarization maintaining optical fibers respectively coupled to said input and output ports, said first and second polarization maintaining fibers having an orientation offset by 90 degrees with respect to one another;
      a single mode fiber coupled to said intermediate port;
      a dispersion compensating fiber coupled to said single mode fiber;
      a Faraday rotator mirror coupled to said dispersion compensating fiber;
   means for orienting a state-of-polarization of predetermined odd-numbered channels to be substantially orthogonal to a state-of-polarization of predetermined even-numbered channels, said orienting means comprises a polarization coupler and first and second wavelength combiners for respectively directing said odd-numbered and said even-numbered channels to said polarization coupler.

17. An apparatus for transmitting a wavelength division multiplexed optical signal, the apparatus comprising:
   means for generating an optical signal including a plurality of optical channels wherein said plurality of optical channels are sequentially numbered from 1 to N from lowest to highest wavelength;
   means for imparting dispersion compensation to each of said plurality of optical channels without a change in polarization of said channels, said dispersion compensating means comprises:
      an optical circulator having an input port, an intermediate port, and an output port;
      first, second and third polarization maintaining optical fibers respectively coupled to said input, said intermediate and said output ports;
      a Faraday rotator coupled to said second polarization maintaining fiber;
      a chirped fiber grating coupled to said Faraday rotator;
   means for orienting a state-of-polarization of predetermined odd-numbered channels to be substantially orthogonal to a state-of-polarization of predetermined even-numbered channels, said orienting means comprises a polarization coupler and first and second wavelength combiners for respectively directing said odd-numbered and said even-numbered channels to said polarization coupler.

18. An apparatus for transmitting a wavelength division multiplexed optical signal, the apparatus comprising:
   means for generating an optical signal including a plurality of optical channels wherein said plurality of optical channels are sequentially numbered from 1 to N from lowest to highest wavelength;
   means for imparting dispersion compensation to each of said plurality of optical channels without a change in polarization of said channels, said dispersion compensators comprises:
      an optical circulator having an input port, an intermediate port, and an output port;
      first, second and third polarization maintaining optical fibers respectively coupled to said input, said intermediate and said output ports;
      a polarizer coupled to said second polarization maintaining fiber;
      a chirped fiber grating coupled to said Faraday rotator;
   means for orienting a state-of-polarization of predetermined odd-numbered channels to be substantially orthogonal to a state-of-polarization of predetermined even-numbered channels, said orienting means comprises a polarization coupler and first and second wavelength combiners for respectively directing said odd-numbered and said even-numbered channels to said polarization coupler.

19. An optical transmitter for transmitting a wavelength division multiplexed optical signal, comprising:
   a plurality of optical sources for generating a plurality of optical channels sequentially numbered from 1 to N from lowest to highest wavelength wherein predetermined odd-numbered channels of said plurality of optical channels oriented in a state-of-polarization substantially orthogonal to a state of polarization of predetermined even-numbered channels;

a plurality of polarization maintaining chromatic dispersion compensators respectively coupled to said optical sources, at least one of said dispersion compensators comprising:
  an optical circulator having an input port, an intermediate port, and an output port;
  first and second polarization maintaining optical fibers respectively coupled to said input and output ports, said first and second polarization maintaining fibers having an orientation offset by 90 degrees with respect to one another;
  a single mode fiber coupled to said intermediate port;
  a dispersion compensating fiber coupled to said single mode fiber;
  a Faraday rotator mirror coupled to said dispersion compensating fiber;
an N×1 multiplexer coupled to a first of said plurality of polarization maintaining chromatic dispersion compensators for combining said optical channels into a wavelength division multiplexed optical signal.

20. The transmitter of claim 19 further including at least one data modulator coupled to at least one of said plurality of optical sources for modulating data from at least one data source onto predetermined ones of said optical channels.

21. An optical transmitter for transmitting a wavelength division multiplexed optical signal, comprising:
  a plurality of optical sources for generating a plurality of optical channels sequentially numbered from 1 to N from lowest to highest wavelength wherein predetermined odd-numbered channels of said plurality of optical channels oriented in a state-of-polarization substantially orthogonal to a state of polarization of predetermined even-numbered channels;
  a plurality of polarization maintaining chromatic dispersion compensators respectively coupled to said optical sources, at least one of said dispersion compensators comprising:
    an optical circulator having an input port, an intermediate port, and an output port;
    first, second and third polarization maintaining optical fibers respectively coupled to said input, said intermediate and said output ports;
    a Faraday rotator coupled to said second polarization maintaining fiber;
    a chirped grating coupled to said Faraday rotator;
  an N×1 multiplexer coupled to a first of said plurality of polarization maintaining chromatic dispersion compensators for combining said optical channels into a wavelength division multiplexed optical signal.

22. The transmitter of claim 21 further including at least one data modulator coupled to at least one of said plurality of optical sources for modulating data from at least one data source onto predetermined ones of said optical channels.

23. An optical transmitter for transmitting a wavelength division multiplexed optical signal, comprising:
  a plurality of optical sources for generating a plurality of optical channels sequentially numbered from 1 to N from lowest to highest wavelength wherein predetermined odd-numbered channels of said plurality of optical channels oriented in a state-of-polarization substantially orthogonal to a state of polarization of predetermined even-numbered channels;
  a plurality of polarization maintaining chromatic dispersion compensators respectively coupled to said optical sources, at least one of said dispersion compensators comprising:
    an optical circulator having an input port, an intermediate port, and an output port;
    first, second and third polarization maintaining optical fibers respectively coupled to said input, said intermediate and said output ports;
    a polarizer coupled to said second polarization maintaining fiber;
    a chirped fiber grating coupled to said Faraday rotator;
  an N×1 multiplexer coupled to a first of said plurality of polarization maintaining chromatic dispersion compensators for combining said optical channels into a wavelength division multiplexed optical signal.

24. The transmitter of claim 23 further including at least one data modulator coupled to at least one of said plurality of optical sources for modulating data from at least one data source onto predetermined ones of said optical channels.

25. A dispersion compensator, comprising:
  a polarization beam splitter having a first, second and third ports;
  first and second polarization maintaining optical fibers respectively coupled to said first and third ports;
  an optical fiber coupled at a first end to said second port of said polarization beam splitter;
  a Faraday rotator coupled to a second end of said optical fiber; and
  a chirped fiber grating coupled to said Faraday rotator.

* * * * *

UNITED STATES PATENT AND TRADEMARK OFFICE
CERTIFICATE OF CORRECTION

PATENT NO. : 6,411,413 B1
DATED : June 25, 2002
INVENTOR(S) : Neal S. Bergano

It is certified that error appears in the above-identified patent and that said Letters Patent is hereby corrected as shown below:

<u>Column 4,</u>
Line 13, please delete "continuous-wave";
Line 13, please insert the word -- data -- after the word "optical";
Line 61, please delete "500" and insert -- 400 --; and
Line 61, please delete "3" and insert -- 4 --.

Signed and Sealed this

Twenty-second Day of April, 2003

JAMES E. ROGAN
*Director of the United States Patent and Trademark Office*